US011182951B2

(12) United States Patent
Linåker et al.

(10) Patent No.: US 11,182,951 B2
(45) Date of Patent: Nov. 23, 2021

(54) 3D OBJECT MODELING USING SCALE PARAMETERS AND ESTIMATED DISTANCE

(71) Applicant: SONY CORPORATION, Tokyo (JP)

(72) Inventors: Daniel Linåker, Lund (SE); Pal Szasz, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/962,745

(22) PCT Filed: Feb. 23, 2018

(86) PCT No.: PCT/US2018/019367
§ 371 (c)(1),
(2) Date: Jul. 16, 2020

(87) PCT Pub. No.: WO2019/164500
PCT Pub. Date: Aug. 29, 2019

(65) Prior Publication Data
US 2020/0357166 A1 Nov. 12, 2020

(51) Int. Cl.
*G06T 15/20* (2011.01)
*G06T 7/55* (2017.01)
*G06T 15/50* (2011.01)
*G06T 17/20* (2006.01)
(Continued)

(52) U.S. Cl.
CPC .............. *G06T 15/205* (2013.01); *G06T 7/55* (2017.01); *G06T 15/506* (2013.01); *G06T 17/00* (2013.01); *G06T 17/20* (2013.01); *G06T 17/205* (2013.01); *G06T 19/20* (2013.01); *G06T 2219/2016* (2013.01)

(58) Field of Classification Search
CPC ..... G06T 15/205; G06T 15/506; G06T 17/00; G06T 17/20; G06T 17/205; G06T 19/20; G06T 2219/2016; G06T 7/55
See application file for complete search history.

(56) References Cited

U.S. PATENT DOCUMENTS

| 2011/0187820 A1* | 8/2011 | Gilboa ................. H04N 13/128 348/43 |
| 2016/0012646 A1* | 1/2016 | Huang .................... G06T 5/005 345/419 |

(Continued)

FOREIGN PATENT DOCUMENTS

| WO | 2015/173173 A1 | 11/2015 |
| WO | 2017/115149 A1 | 7/2017 |

OTHER PUBLICATIONS

Notification of Transmittal of the International Search Report and the Written Opinion of the International Searching Authority, or the Declaration, in corresponding PCT Application No. PCT/US2018/019367 (dated May 29, 2018).

*Primary Examiner* — Daniel F Hajnik
(74) *Attorney, Agent, or Firm* — Myers Bigel, P.A.

(57) ABSTRACT

Methods of modeling a three-dimensional (3D) object are provided. A method of modeling a 3D object includes generating a 3D model of at least a portion of the 3D object based on data from a plurality of two-dimensional (2D) images. Moreover, the method includes scaling the 3D model by estimating a distance to the 3D object. Related devices and computer program products are also provided.

15 Claims, 17 Drawing Sheets

(51) Int. Cl.
G06T 19/20 (2011.01)
G06T 17/00 (2006.01)

(56) References Cited

U.S. PATENT DOCUMENTS

2016/0073096 A1* 3/2016 Hillebrand ............. H04N 5/772
  348/47
2018/0025496 A1 1/2018 Lindner et al.
2018/0205926 A1* 7/2018 Mogalapalli ............ G06T 5/005

* cited by examiner

3D OBJECT MODELING USING SCALE PARAMETERS AND ESTIMATED DISTANCE

CROSS REFERENCE TO RELATED APPLICATION

This application is a 35 U.S.C. § 371 national stage application of PCT International Application No. PCT/US2018/019367, filed on Feb. 23, 2018, the content of which is incorporated herein by reference in its entirety. The above-referenced PCT International Application was published in the English language as International Publication No. WO 2019/164500 A1 on Aug. 29, 2019.

FIELD

The present disclosure relates to image processing.

BACKGROUND

The increased availability of technology for scanning and printing three-dimensional (3D) objects has enabled a wide range of individuals and organizations to scan, design, or even print their own models and parts on an on-demand basis. For example, an image feed from one or more cameras may be used to digitally reconstruct a physical 3D object. As an example, the image feed may be used to create one or more dense point clouds, and to create a polygonal mesh based on the point cloud(s). The point cloud(s) may be created using, for example, stereo disparity estimation based on image frames with different respective timestamps. One or more dimensions of the resulting polygonal mesh, however, may be distorted due to difficulty in determining the size of the physical 3D object. As a result, when multiple 3D objects are digitally reconstructed, the relative sizes of the different digital reconstructions may be incorrect.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of present inventive concepts.

Various embodiments of present inventive concepts include a method of modeling a 3D object. The method may include rendering a first portion of a mesh representation of the 3D object with respect to a first position of a first sensor of a wireless electronic device. The method may include simulating a first distance from the first portion of the mesh representation to a second sensor of the wireless electronic device. The method may include determining a first scale parameter for the first portion of the mesh representation based on the first distance. The method may include rendering a second portion of the mesh representation of the 3D object with respect to a second position of the first sensor. The method may include simulating a second distance from the second portion of the mesh representation to the second sensor. The method may include determining a second scale parameter for the second portion of the mesh representation based on the second distance. Moreover, the method may include estimating a simulation distance between the first sensor and the second sensor, based on the first and second scale parameters and based on a predetermined physical distance between the first sensor and the second sensor. Advantageously, these operations may provide scaling for a 3D model that may otherwise have an incorrect scale. Moreover, by accounting for the distance between the first and second sensors, these operations may increase the precision of the scaling.

According to various embodiments, the method may include converting the mesh representation of the 3D object into a 3D model of the 3D object by adjusting scaling of the mesh representation of the 3D object based on the first and second scale parameters.

In various embodiments, simulating the first distance may include simulating a first plurality of distances from a first plurality of points, respectively, of the first portion of the mesh representation to the second sensor. The method may include determining an average value of the first plurality of distances. Similarly, simulating the second distance may include simulating a second plurality of distances from a second plurality of points, respectively, of the second portion of the mesh representation to the second sensor, and the method may include determining an average value of the second plurality of distances.

According to various embodiments, determining the average value of the first plurality of distances may include determining a weighted average with respect to a first position of a first sensor. Determining the weighted average may include multiplying the first plurality of distances by a plurality of weight parameters, respectively, to provide a plurality of multiplication results. The plurality of weight parameters may be determined based on a plurality of color values, respectively, of the first portion of the mesh representation and based on the first plurality of distances. Determining the weighted average may include summing the plurality of multiplication results, and summing the plurality of weight parameters. Moreover, determining the weighted average may include dividing the sum of the plurality of multiplication results by the sum of the plurality of weight parameters.

In various embodiments, the method may include determining an average value of a plurality of scale parameters including the first and second scale parameters. Estimating the simulation distance between the first sensor and the second sensor may be performed based on the average value of the plurality of scale parameters. In some embodiments, estimating the simulation distance based on the average value of the plurality of scale parameters may include estimating a first simulation distance. Moreover, the method may include estimating a second simulation distance.

Estimating the second simulation distance may include selecting an updated first portion of the mesh representation that is offset from the first portion of the mesh representation based on the first simulation distance. Estimating the second simulation distance may include simulating an updated first distance from the updated first portion of the mesh representation to the second sensor. Estimating the second simulation distance may include determining an updated first scale parameter for the updated first portion of the mesh representation based on the updated first distance. Estimating the second simulation distance may include selecting an updated second portion of the mesh representation that is offset from the second portion of the mesh representation based on the first simulation distance. Estimating the second simulation distance may include simulating an updated second distance from the updated second portion of the mesh representation to the second sensor. Estimating the second simulation distance may include determining an updated second scale parameter for the updated second portion of the mesh representation based on the updated second distance. Estimating the second simulation distance may include determining an average value of an updated plurality of scale parameters including the updated first and second scale parameters. Moreover, estimating the second simulation distance may include dividing the predetermined physical distance between the first sensor and the second sensor by the average value of the updated plurality of scale parameters.

According to various embodiments, estimating the first simulation distance may be preceded by selecting the first portion of the mesh representation based on an initial simulation distance of zero. Additionally or alternatively, rendering the first portion of the mesh representation may include rendering a depth map of the first portion of the mesh representation. Moreover, the method may include storing the depth map in a storage medium. In some embodiments, rendering the depth map may be performed using data from the first sensor and the second sensor.

In various embodiments, the first sensor and the second sensor may be different types of sensors, respectively. For example, the first sensor and the second sensor may be an image sensor and a single-beam time-of-flight sensor, respectively. Additionally or alternatively, the method may include receiving, in a storage medium, image data for the 3D object from an image capture device, and rendering the first portion of the mesh representation and rendering the second portion of the mesh representation may be performed using the image data.

According to various embodiments, the method may include adjusting a value of the first distance based on a first color of a first pixel of the first portion of the mesh representation. Determining the first scale parameter may be performed based on the adjusted value of the first distance. Similarly, the method may include adjusting a value of the second distance based on a second color of a second pixel of the second portion of the mesh representation, and determining the second scale parameter may be performed based on the adjusted value of the second distance.

A method of modeling a 3D object, according to various embodiments, may include capturing a plurality of 2D images of the 3D object from different points of perspective relative to the 3D object, in an image capture device. The method may include generating a 3D model of at least a portion of the 3D object from the captured plurality of 2D images. Moreover, the method may include scaling dimensions of the 3D model by estimating a distance between the 3D object and the image capture device using signals generated by the image capture device and reflected off the 3D object during said capturing.

In various embodiments, said image capture device may include a time-of-flight sensor; and said estimating a distance may include detecting the signals using the time-of-flight sensor. Moreover, said estimating a distance may include generating an emulation of the signals detected using the time-of-flight sensor by simulating how the signals generated by said image capture device and reflected off the 3D object during said capturing would illuminate the 3D model from a plurality of the different points of perspective. For example, said generating an emulation may include mapping the emulation to the signals detected using the time-of-flight sensor.

According to various embodiments, said image capture device may include a lens through which the plurality of 2D images are captured and a time-of-flight sensor, which is offset relative to the lens. Moreover, said estimating a distance may include detecting the signals using the time-of-flight sensor. In some embodiments, the signals may be generated and detected by the time-of-flight sensor.

According to various embodiments, said generating and scaling may include rendering a first portion of the 3D model of the 3D object with respect to a first of the different points of perspective. Said generating and scaling may include simulating a first distance from the first portion of the 3D model to a time-of-flight sensor of said image capture device. Said generating and scaling may include determining a first scale parameter for the first portion of the 3D model based on the first distance. Said generating and scaling may include rendering a second portion of the 3D model of the 3D object with respect to a second of the different points of perspective. Said generating and scaling may include simulating a second distance from the second portion of the 3D model to the time-of-flight sensor. Moreover, said generating and scaling may include determining a second scale parameter for the second portion of the 3D model based on the second distance. In some embodiments, said scaling may include adjusting scaling of the 3D model based on the first and second scale parameters.

In various embodiments, an electronic device may include a processor. Moreover, the electronic device may include a storage medium coupled to the processor and including computer readable program code therein that when executed by the processor causes the processor to perform any of the method operations. Additionally or alternatively, a computer program product may include a non-transitory computer readable storage medium that includes computer readable program code therein that when executed by a processor causes the processor to perform any of the method operations.

An electronic device, according to various embodiments, may include a processor and a storage medium coupled to the processor and including computer readable program code that when executed by the processor causes the processor to perform operations including rendering a first portion of a mesh representation of a 3D object with respect to a first position of a first sensor of a wireless electronic device. The operations may include simulating a first distance from the first portion of the mesh representation to a second sensor of the wireless electronic device. The operations may include determining a first scale parameter for the first portion of the mesh representation based on the first distance. The operations may include rendering a second portion of the mesh representation of the 3D object with respect to a second position of the first sensor. The operations may include simulating a second distance from the second portion of the mesh representation to the second sensor. The operations may include determining a second scale parameter for the second portion of the mesh representation based on the second distance. Moreover, the operations may include estimating a simulation distance between the first sensor and the second sensor, based on the first and second scale parameters and based on a predetermined physical distance between the first sensor and the second sensor.

BRIEF DESCRIPTION OF THE DRAWINGS

The accompanying drawings, which form a part of the specification, illustrate various embodiments of present inventive concepts. The drawings and description together serve to fully explain embodiments of present inventive concepts.

DETAILED DESCRIPTION

Figure 1A:
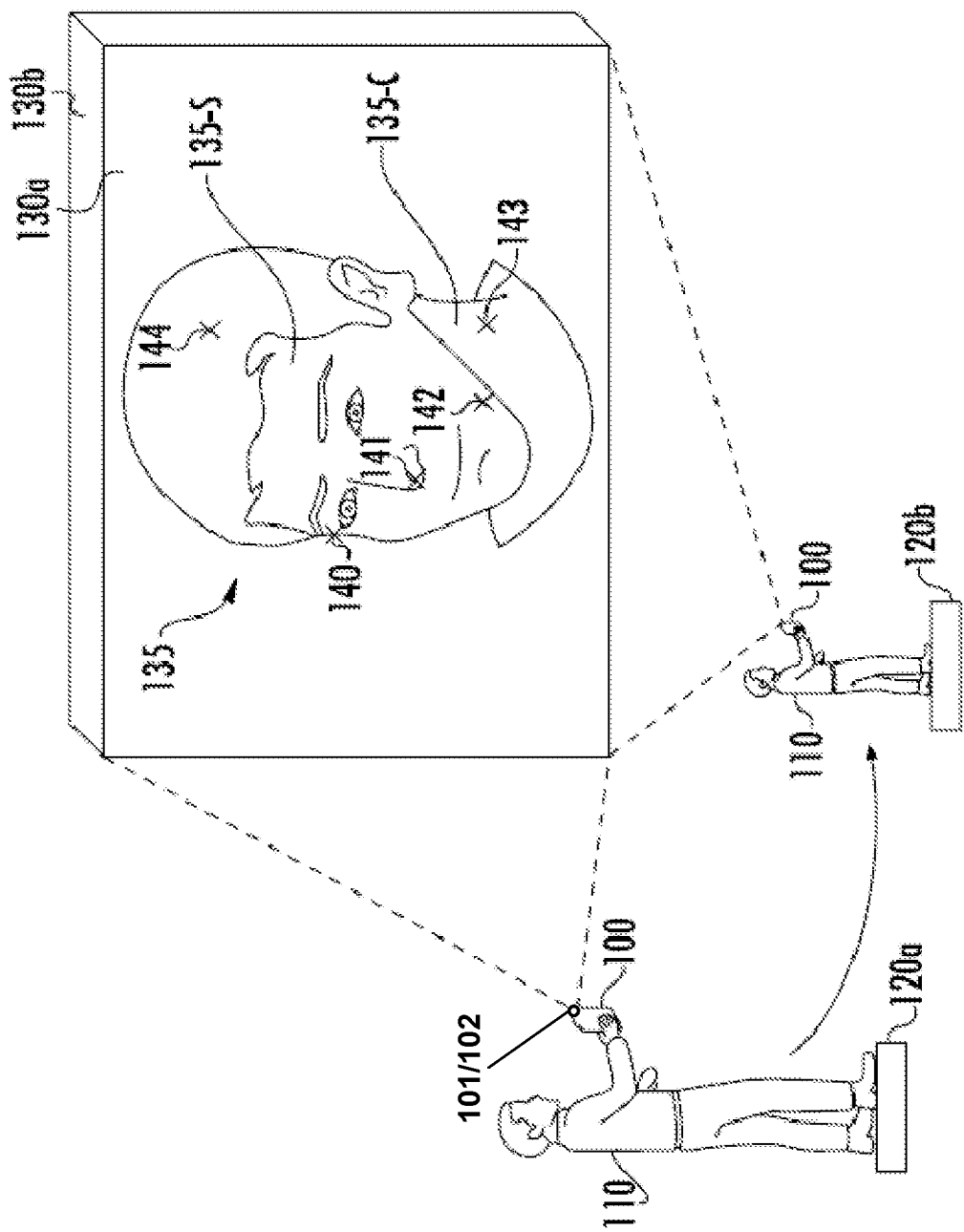
FIG. 1A is a diagram that illustrates a user capturing multiple images of an object with an electronic device, according to various embodiments of present inventive concepts.

Many wireless electronic devices generate an image feed using only one camera. For example, a wireless electronic device may include one rear-facing camera and/or one forward-facing camera. Using an image feed from a single camera, it is possible to perform 3D object reconstruction based on the image data. One drawback with such monocular object reconstruction, however, is the lack of scale. For example, using only a single camera, it may be difficult to determine whether the scanned object's size is 2 meters or 2 millimeters, as small but near objects may have the same projection size on the image sensor as large but distant objects.

Various embodiments of present inventive concepts, however, may provide scaling for 3D models by taking advantage of one or more sensors included in a wireless electronic device. For example, in addition to camera/image sensors, some devices may include extra sensors, such as single-beam time-of-flight sensors, which project light (e.g., infrared light and/or visible light) in front of a camera, and measure the time it takes for the photons to be reflected back into the sensors. These additional sensors are usually used for auto-focusing. In particular, by measuring the time it takes for a photon to travel from the device to the 3D object, then back from the 3D object to the device, these additional sensors can calculate the object distance (e.g., in the metric system). Some embodiments of present inventive concepts may use these additional sensors to perform scale estimation for 3D objects.

For example, some embodiments may use a single-beam time-of-flight sensor measurement to calculate the real-world (e.g., metric) scale of a 3D object during 3D reconstruction. Such 3D reconstruction may include processing that occurs after building a 3D mesh of the 3D object. As an example, scaling operations (e.g., calculating a scale factor) described herein may occur during calculation of coloring of the 3D mesh.

With each light pulse, a single-beam time-of-flight sensor produces a single measurement (hence the name "single-beam"). The single measurement, however, has a relatively wide field of view, as the time-of-flight sensor measures the reflected light from multiple directions. As such, the distance measured by the time-of-flight sensor is not a distance to a single point (e.g., the center) of a 3D object, but an average (e.g., a weighted average) of distances to multiple points on the surface of the 3D object. 3D reconstruction may include, however, attempting to calculate the camera position relative to the center of the 3D object. One challenge is that this distance is in an unknown scale (with unknown units). But calculating the ratio of (a) the actual object distance measured by the time-of-flight sensor and (b) the object distance estimated/simulated during 3D reconstruction will provide a global scale factor, which may be used to scale the 3D model to the metric system.

For example, various embodiments of present inventive concepts may compensate for object distance being in an unknown scale by emulating the behavior of the time-of-flight sensor using the 3D reconstruction scale. Such emulation may include, for example, calculating what value the time-of-flight sensor would return if the 3D reconstruction scale were the metric scale. The scale ratio can then be calculated from multiple measurements. Moreover, the mean and standard deviation may be calculated to reduce measurement noise and to estimate the measurement precision.

Emulating the time-of-flight sensor during 3D reconstruction can be achieved by rendering the 3D mesh from a camera's point of view, into a depth buffer. The depth buffer is a buffer in which each pixel represents the distance of that point from the camera. This rendering can be executed by the graphics processing unit (GPU) of a wireless electronic device using, for example, OPENGL®. The depth buffer may differentiate between pixels closer to the camera and pixels farther away from the camera. For example, the luminance of the pixels may represent the their distance from the camera.

Accordingly, some embodiments herein may emulate the time-of-flight sensor to determine the scale of a scanned 3D object. This may be beneficial when scanning multiple 3D objects, as it may provide the correct sizes of the different 3D objects relative to each other. Otherwise, a 3D model of one 3D object may be too large or too small relative to a 3D model of another 3D object. Moreover, some embodiments herein may compensate for the distance between the time-of-flight sensor and the image sensor that captures images of the 3D object, and/or may compensate for coloring of the 3D object.

FIG. 1A is a diagram that illustrates a user 110 capturing multiple 2D images 130 of a physical 3D object 135 with an electronic device 100, according to various embodiments of present inventive concepts. Although FIG. 1A illustrates an example in which the images 130 are captured by one or more sensors 101/102 of an image capture device 340 (FIG. 3A) at the electronic device 100, the images 130 may alternatively be captured by another device and subsequently received by the electronic device 100.

In FIG. 1A, the user 110 initiates a photographic session of the object 135, such as a person's face or an automobile, at location 120a. The user 110 may physically move around the object 135 to various locations, such as from the location 120a to a different location 120b. An image 130 of the object 135 is captured at each location. For example, image 130a is captured when the electronic device 100 is at the location 120a, and image 130b is captured when the electronic device 100 moves to the different location 120b. The captured images 130 may each be two-dimensional (2D) images.

The electronic device 100 may provide images 130 at various angles as the user 110 walks around the object 135. For example, the user 110 may capture images 130 around 360 degrees (or, alternatively, at least 180 degrees) of the object 135. After capturing at least two images 130, such as the images 130a and 130b, the images 130 may be processed by a processor 350 (FIG. 3A) in the electronic device 100, or by a processor external to the electronic device 100, to construct a digital 3D model 150/150' (FIG. 1B) of the object 135, or to otherwise generate a 3D image. The terms "construct" (or "constructing"), "generate" (or "generating"), and "build" (or "building") may be used interchangeably herein.

Figure 1B:
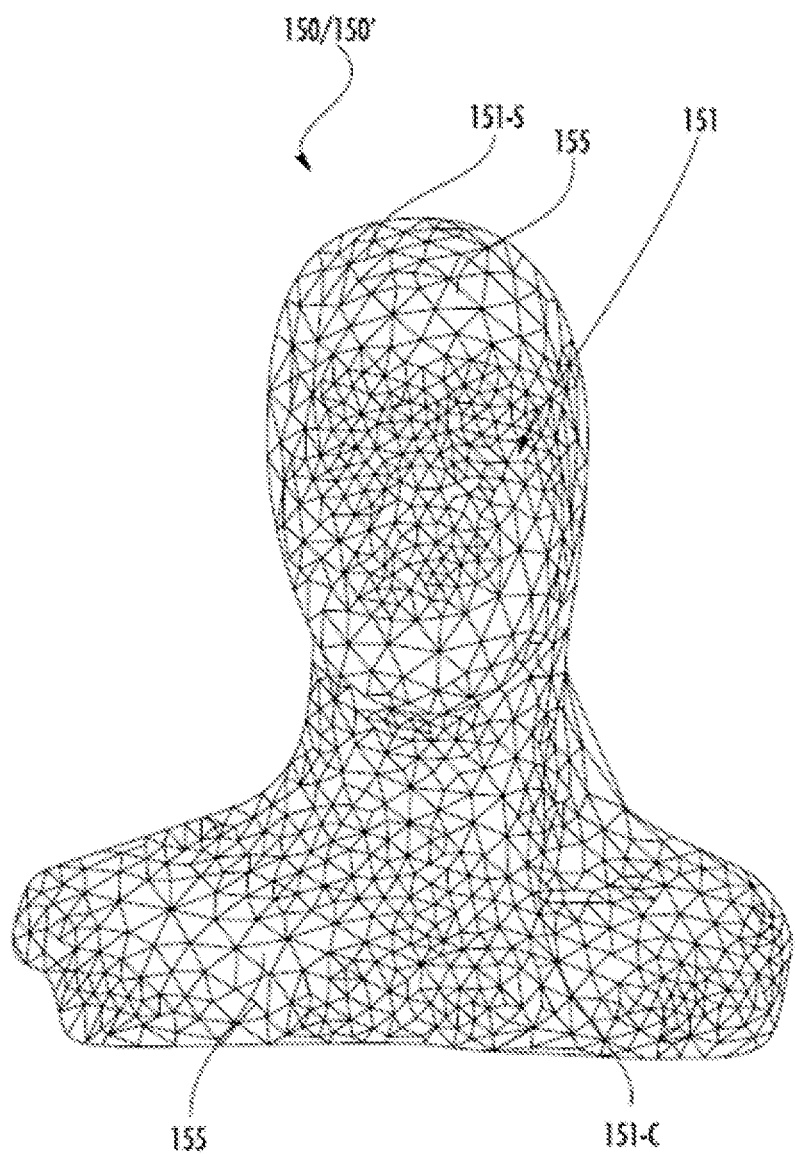
FIGS. 1B-1D are diagrams that illustrate 3D models of an object, according to various embodiments.

FIG. 1B is diagram that illustrates a digital 3D model 150/150' of an object 135, according to various embodiments. In some embodiments, the digital 3D model 150/150' of the object 135 may model two differently-shaped regions of the object 135. For example, the digital 3D model 150/150' may model both an upper region 135-S (FIG. 1A) that is generally spherically (or hemi-spherically) shaped and a lower region 135-C (FIG. 1A) that is generally cylindrically shaped. As an example, a top region of a human head may generally be hemi-spherically shaped, whereas neck and shoulder areas may be more accurately modeled by a cylinder.

Processing of the images 130 may include identifying points 140-144 (FIG. 1A) of the object 135 as captured in the images 130. The points 140-144 may include various edges, corners, or other points on a surface of the object 135. The points 140-144 may be recognizable locations on the physical object 135 that are tracked in various images 130 of the physical object 135. In some embodiments, constructing a digital 3D model 150/150' of the object 135 may involve capturing several (e.g., three, four, five, or more) images 130 of the object 135 and identifying tens, hundreds, or thousands of points 140-144. Locations (e.g., coordinates) of the points 140-144 may be estimated using various modeling/statistical techniques.

The digital 3D model 150/150' of the object 135 includes an exterior surface 151 that may include a plurality of polygons 155, each of which may include one or more pixels/points therein. The plurality of polygons 155 provide a representation of an exterior surface of the object 135. For example, the plurality of polygons 155 may model features, such as features at the points 140-144, on the exterior surface of the object 135. In some embodiments, the plurality of polygons 155 may include a plurality of triangles. Additionally or alternatively, texture (e.g., hair or skin, when the object 135 is a person) may be mapped to the plurality of polygons 155.

The exterior surface 151 of the digital 3D model 150/150' may include two portions that model two differently-shaped portions, respectively, of the object 135. As an example, the exterior surface 151 of the preliminary digital 3D model 150 may include an upper portion 151-S that models the upper portion 135-S of the object 135 that is generally spherically (or hemi-spherically) shaped, and may further include a lower portion 151-C that models the lower portion 135-C of the object 135 that is generally shaped like a cylinder.

In some embodiments, a preliminary digital 3D model 150 may be a digital mesh representation of the object 135. A digital 3D model 150' may be a second model that is constructed by modifying/refining the preliminary digital 3D model 150 (a first model). The preliminary digital 3D model 150 and the digital 3D model 150' are both digital models and may be referred to as "computer," "virtual," "mesh," or "electronic" models of the physical object 135. In some embodiments, the scale of the digital 3D model 150' may be different from the scale of preliminary digital 3D model 150. For example, the scale of the digital 3D model 150' may be closer to the scale of the object 135. Additionally or alternatively, a level of topological detail of the exterior surface 151 may be higher in the digital 3D model 150' than in the preliminary digital 3D model 150. In some embodiments, color and/or texture of the exterior surface 151 may be added to the preliminary digital 3D model 150, or may be provided at an increased level of detail, when constructing the digital 3D model 150'.

Figure 1C:
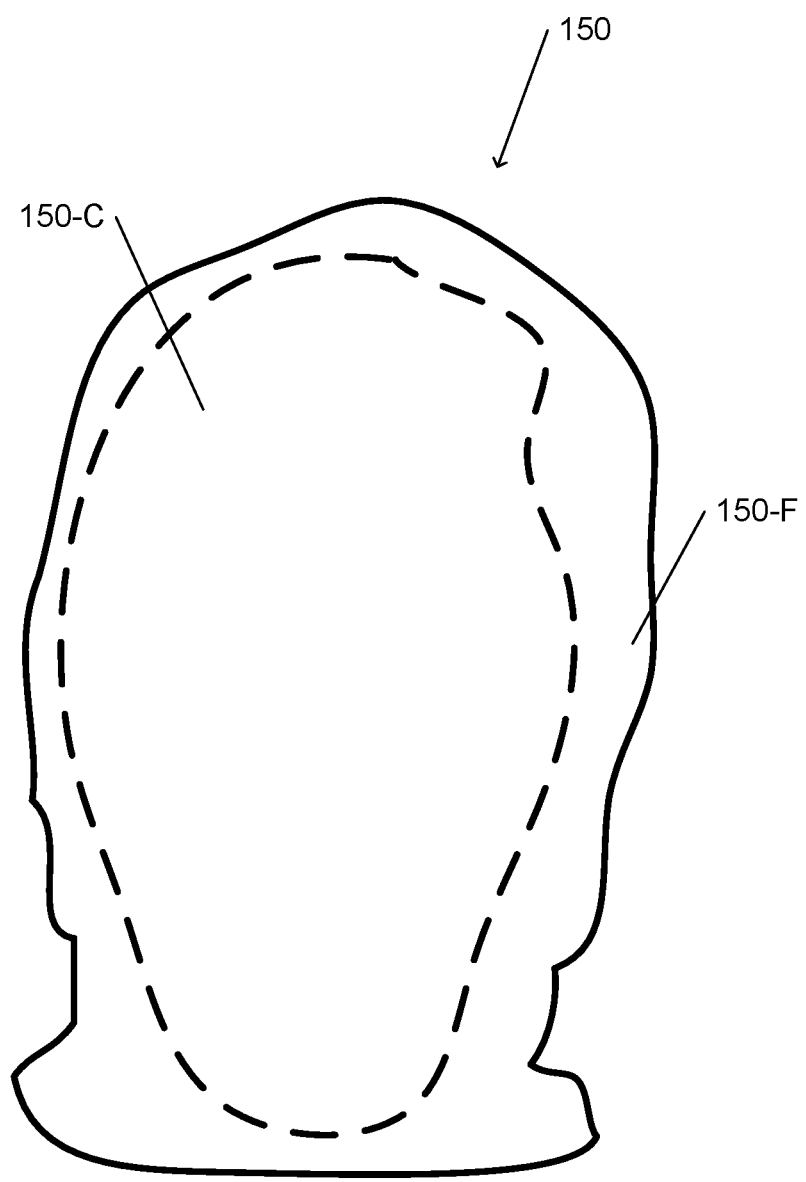

FIG. 1C is a diagram that illustrates a preliminary digital 3D model 150, according to various embodiments. The preliminary digital 3D model 150 may, in some embodiments, indicate different depths thereof. For example, the preliminary digital 3D model 150 may indicate one or more regions 150-C as being closer to a sensor 101 that captured image data from which the preliminary digital 3D model 150 is derived. Moreover, the preliminary digital 3D model 150 may indicate one or more regions 150-F as being farther (than the region(s) 150-C) from the sensor 101 that captured image data from which the preliminary digital 3D model 150 is derived. As an example, when the sensor 101 is facing an object 135 that is a human face, the region(s) 150-C may include features such as a nose and a forehead, whereas the region(s) 150-F may include features such as ears. In some embodiments, variations in depth may be indicated on the preliminary digital 3D model 150 in the form of different colors or different shades of a particular color. For example, the region(s) 150-C may appear darker, whereas the region(s) 150-F may appear brighter.

Figure 1D:
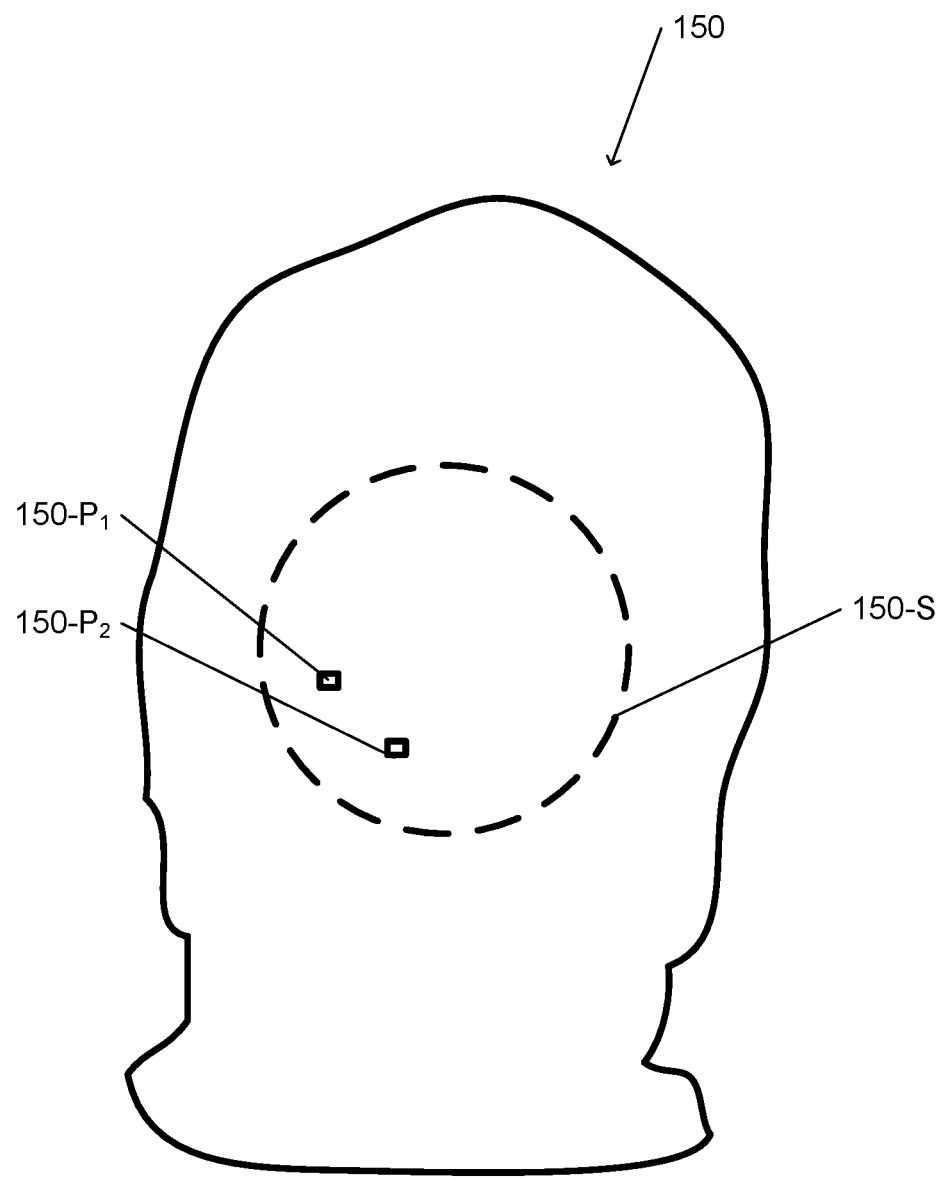

FIG. 1D is a diagram that illustrates a preliminary digital 3D model 150, according to various embodiments. In particular, FIG. 1D illustrates that a portion 150-S of the preliminary digital 3D model 150 may be selected. For example, the selected portion 150-S may be selected from the preliminary digital 3D model 150 of FIG. 1C, or from any other digital representation of a 3D object 135. In some embodiments, the selected portion 150-S may be a measurement window/region on the preliminary digital 3D model 150 and may correspond to a field of view of the sensor 102. The selected portion 150-S may include a plurality of pixels/points 150-P, including a first pixel/point 150-$P_1$ and a second pixel/point 150-$P_2$. Although two pixels/points 150-$P_1$, 150-$P_2$ are illustrated, it will be understood that the plurality of pixels/points 150-P in the selected portion 150-S may include tens, hundreds, thousands, or more pixels/points 150-P.

Figure 1E:
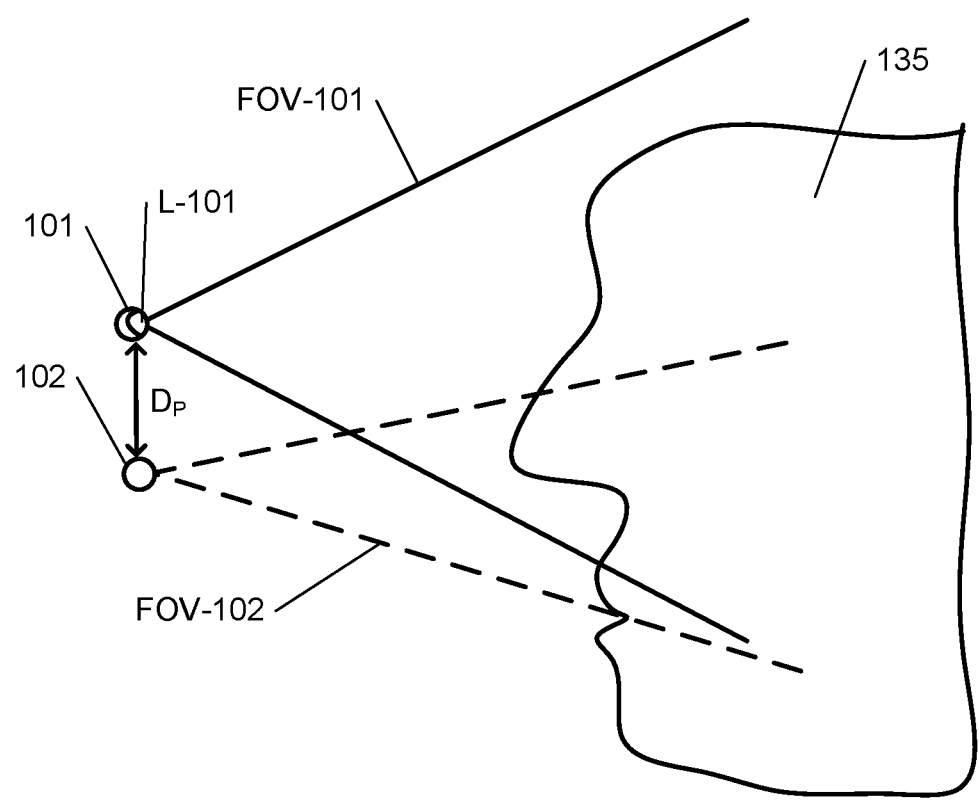
FIG. 1E is a diagram that illustrates respective fields of view of two sensors, according to various embodiments.

FIG. 1E is a diagram that illustrates respective fields of view of two sensors 101, 102, according to various embodiments. The sensors 101, 102 may be, for example, sensors of an image capture device 340 (FIG. 3A) of an electronic device 100. In the example of FIG. 1E, the sensors 101, 102 are facing a 3D object 135 that is a human head/face. For example, a lens L-101 may be on the sensor 101 and may face the 3D object 135. The sensor 101 captures a field of view FOV-101. The sensor 102, which is spaced apart from the sensor 101 by a physical distance $D_P$ on/in the electronic device 100, captures a field of view of FOV-102 (illustrated in broken line). Due to this physical distance $D_P$, a distance between the sensor 102 and a point on the 3D object 135 may be different from a distance between the sensor 101 and the point on the 3D object 135. Accordingly, it may be desirable to account for this physical distance $D_P$ when simulating/estimating a distance between the sensor 102 and a point on a digital 3D model 150 that is based on image data captured by the sensor 101.

FIGS. 2A to 2J are flowcharts of operations for modeling a 3D object 135, according to various embodiments. Although an electronic device 100 may be configured to perform any of the operations in the flowcharts of FIGS. 2A to 2J, one or more of the operations may, in some embodiments, be performed outside of the electronic device 100.

Figure 2A:
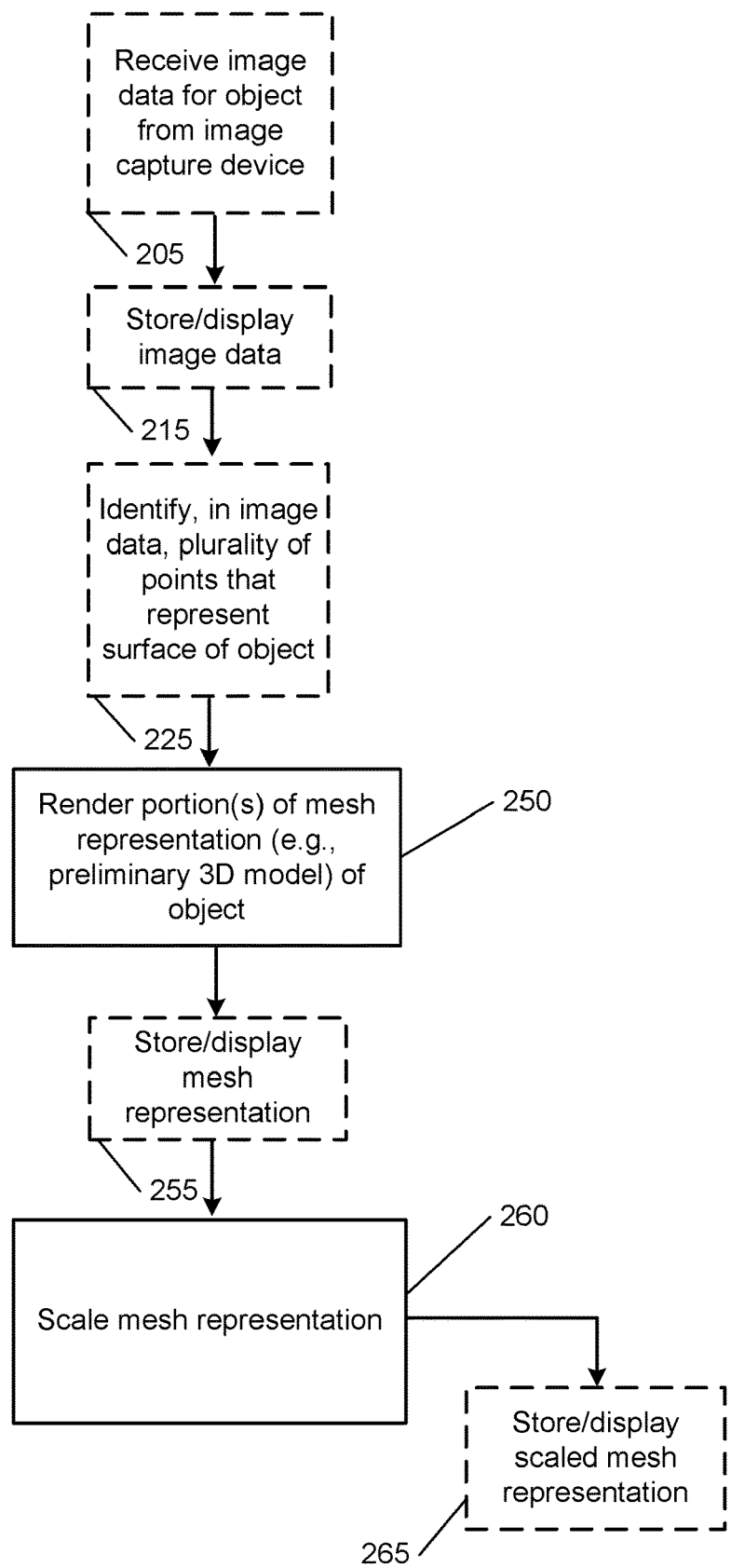
FIGS. 2A to 2J are flowcharts of operations for modeling a 3D object, according to various embodiments.
Figure 2B:
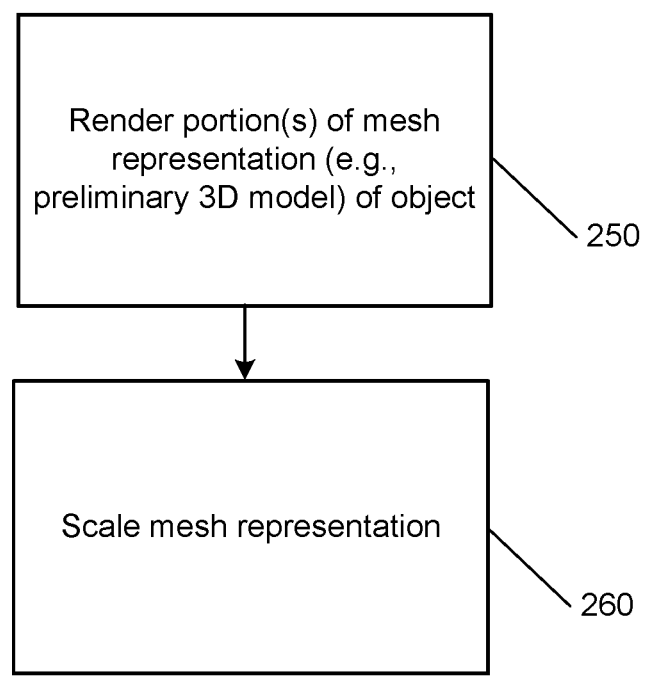

Referring to FIGS. 2A and 2B, operations for modeling the 3D object 135 include rendering (Block 250) one or more portions of a mesh representation, or other digital 3D representation, of one or more portions of the 3D object 135. In some embodiments, the mesh representation may provide a preliminary/unscaled digital 3D model 150 of the 3D object 135. Moreover, the operations include scaling (Block 260) the mesh representation. For example, the operations may include determining a scale of the 3D object 135 and applying the scale to the 3D model 150. The resulting scaled mesh representation may be a scaled 3D model 150'. Accordingly, the operations of Blocks 250 and 260 may, in some embodiments, be referred to herein as operations of constructing the scaled 3D model 150'.

The operations of Blocks 250 and 260 may be performed by an electronic device 100, which may be a smartphone, a tablet computer, a laptop computer, a portable camera, or one of various other portable/wireless electronic devices. Alternatively, the operations of Blocks 250 and 260 may be performed by a server, a desktop computer, a fixed camera (e.g., a security camera), or another electronic device that is separate from, and less portable than, the electronic device 100. The electronic device 100 may, in some embodiments, be referred to as a "mobile device" or a "user equipment."

Referring still to FIG. 2A, operations for modeling the 3D object 135 may include various optional operations. For example, after scaling (Block 260) the mesh representation, the operations may, in some embodiments, include storing/displaying (Block 265) the scaled mesh representation. As an example, the scaled mesh representation may be stored in a storage medium 370 (FIG. 3A) of an electronic device 100. For example, a scaled 3D model 150' may be stored in the storage medium 370. Additionally or alternatively, one or more scale parameters determined in Block 260 may be stored along with the unscaled/preliminary 3D model 150 in the storage medium 370. As an example, the scale parameter(s), which may also be referred to herein as scale ratio(s) or scale factor(s), may be stored in a file, such as an Extensible Markup Language (XML) file, which may be stored in/with the mesh representation. The scale parameter(s) can be combined with the unscaled/preliminary 3D model 150 to generate the scaled 3D model 150'. Additionally or alternatively, the scaled 3D model 150' may be displayed on a display of a Graphical User Interface (GUI) 390 (FIG. 3A) of the electronic device 100. In some embodiments, a user 110 may rotate, or otherwise manipulate, the scaled 3D model 150' that is displayed on the electronic device 100.

After rendering (Block 250) the mesh representation of the 3D object 135, the mesh representation may be stored/displayed (Block 255). For example, the mesh representation may be stored in a storage medium 370 (FIG. 3A) of an electronic device 100 and/or displayed on a display of a GUI 390 (FIG. 3A) of the electronic device 100. As an example, a user 110 of the electronic device 100 may desire to view the mesh representation before scaling (Block 260) the mesh representation.

Figure 3A:
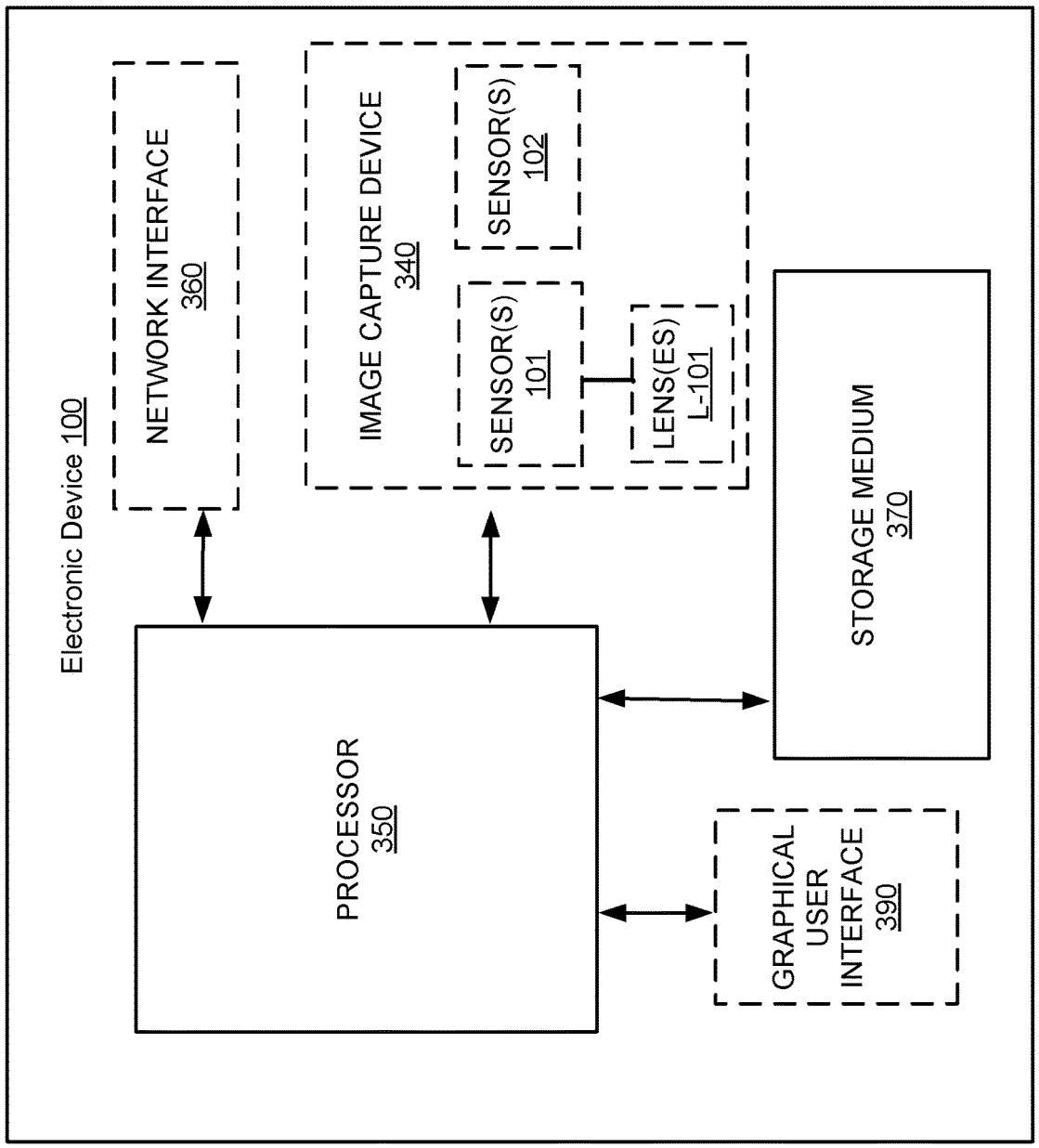
FIG. 3A is a block diagram of an electronic device, according to various embodiments.

Various operations may, in some embodiments, be performed before rendering (Block 250) the mesh representation of the 3D object 135. The operations may include receiving (Block 205), in a storage medium 370 (FIG. 3A), image data for the 3D object 135 from an image capture device 340 (FIG. 3A). In some embodiments, the same electronic device 100 that captures the image data may render (Block 235) the mesh representation of the 3D object 135 based on the image data. Alternatively, one device may capture the image data and a different device may render the mesh representation based on the image data. Moreover, operations of receiving (Block 205) the image data may refer to storing image data in the same electronic device 100 that captured the image data, or to receiving the image data from another device via a network interface 360 (FIG. 3A). In some embodiments, the image data may refer to photos or to frames from a video stream.

In addition to, or as an alternative to, operations of Block 205, operations may, in some embodiments, include storing/displaying (Block 215) image data. For example, the image data may be stored in a storage medium 370 (FIG. 3A) of an electronic device 100 and/or displayed on a display of a GUI 390 (FIG. 3A) of the electronic device 100. As an example, the image data may include a plurality of 2D images 130, and a user 110 of the electronic device 100 may desire to view the 2D images 130 before rendering (Block 250) the mesh representation that is based on the 2D images 130. As the 2D images 130 may all be from the same monocular (i.e., single) camera, it may be difficult to determine a scale of the 3D object 135 (and thus a scale of the mesh representation).

In some embodiments, operations may include identifying (Block 225), in the image data, a plurality of points 140-144 (FIG. 1A) that represent a surface of the 3D object 135. Rendering (Block 250) the mesh representation may be performed using the plurality of points 140-144 that are identified. In some embodiments, rendering (Block 250) the mesh representation may be referred to herein as "building" or "constructing" one or more portions of the mesh representation. For example, rendering (Block 250) the mesh representation may be referred to herein as "building" or "constructing" the unscaled/preliminary digital 3D model 150 with respect to one or more portions of the 3D object 135.

Figure 2C:
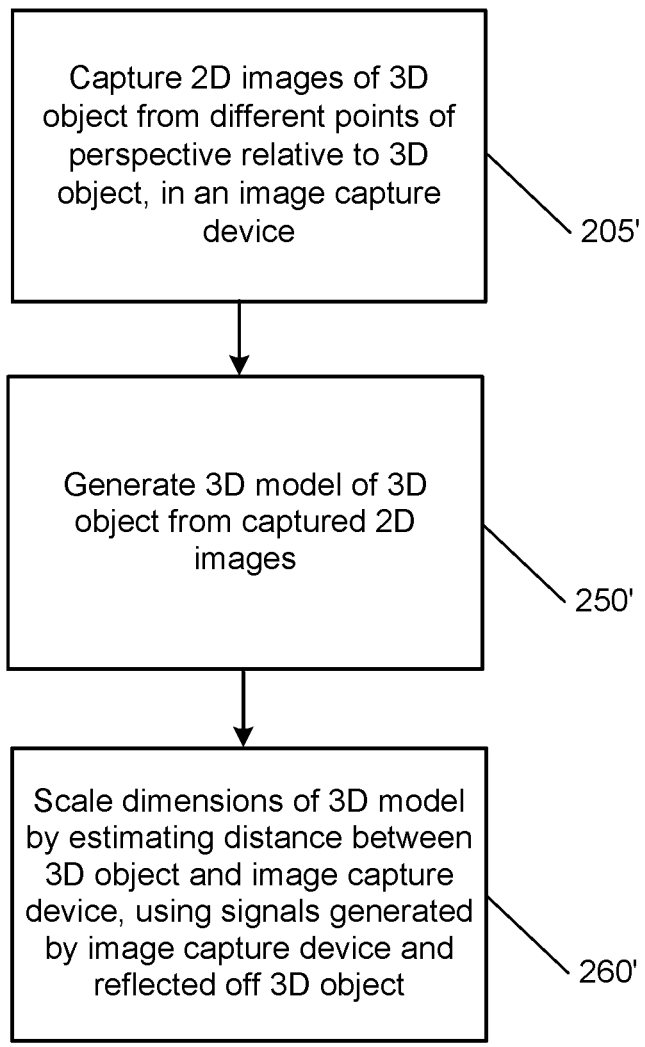

Referring now to FIG. 2C, operation(s) of receiving (Block 205) image data may include capturing (Block 205') a plurality of 2D images 130 of the 3D object 135 from different points of perspective relative to the 3D object 135, in an image capture device 340 (Block 3A). The image capture device 340 may be a monocular camera. The different points of perspective may include, for example, a first point of perspective from the location 120a (FIG. 1A) and a different second point of perspective from the location 120b of (FIG. 1A). Operation(s) of rendering (Block 250) the mesh representation may include generating (Block 250') an unscaled/preliminary digital 3D model 150 of at least a portion of the 3D object 135 from the plurality of captured 2D images 130. Moreover, operations of scaling (Block 260) the mesh representation may include scaling (Block 260') one or more dimensions of the 3D model 150 by estimating a distance between the 3D object 135 and the image capture device 340, using signals that are both (i) generated by the image capture device 340 and (ii) reflected off of the 3D object 135 during the capturing (Block 205'). Accordingly, the signals, which may be infrared or visible light, are signals that return to the image capture device 340 to be detected during the capturing (Block 205').

For example, the image capture device 340 may include a time-of-flight sensor 102, and operation(s) of estimating the distance between the 3D object 135 and the image capture device 340 may include detecting the signals using the time-of-flight sensor 102. As an example, the time-of-flight sensor 102 may detect the signals during the capturing (Block 205'). Moreover, operation(s) of estimating the distance may include generating an emulation of the signals that are detected using the time-of-flight sensor 102 by simulating how the signals, which are generated by the time-of-flight sensor 102 and reflected off the 3D object 135 during the capturing (Block 205'), would illuminate the 3D model 150 from a plurality of the different points of perspective. Accordingly, the term "simulating," as used herein, refers to one example of estimating the distance between the 3D object 135 and the image capture device 340. The plurality of the different points of perspective may be, for example, respective points of perspective from the different locations 120a, 120b (FIG. 1A). In some embodiments, generating an emulation may include mapping the emulation to the signals that are detected using the time-of-flight sensor 102.

Additionally or alternatively, the image capture device 340 may include a lens L-101 (FIGS. 1E and 3A) through which the plurality of 2D images 130 are captured, and may further include a time-of-flight sensor 102, which is offset relative to the lens L-101. Operation(s) of estimating the distance between the 3D object 135 and the image capture device 340 may include using the time-of-flight sensor 102 to detect the signals that are both (i) generated by the image capture device 340 and (ii) reflected off of the 3D object 135 during the capturing (Block 205'). In some embodiments, the signals are both generated and detected by the time-of-flight sensor 102.

Moreover, as an alternative to using the time-of-flight sensor 102 to detect the signals that are both (i) generated by the image capture device 340 and (ii) reflected off of the 3D object 135, the operation(s) of Block 260' may instead include scaling dimensions of the 3D model 150 by estimating a distance between the 3D object 135 and the image capture device 340 using signals that are both (a) reflected off of the 3D object 135 and (b) detected by the image capture device 340 during the capturing (Block 205'). For example, as modern cameras have a large number of auto-focus points, a camera may focus at each focus point in a 2D array of focus points and determine distance for each focus point mapped to pixels on an image sensor 101, without using a dedicated time-of-flight sensor 102. Dedicated time-of-flight sensors 102, however, may provide better precision than auto-focus sensors for distance measurements. Moreover, the dedicated time-of-flight sensors 102 may help with auto-focus operations.

Figure 2D:
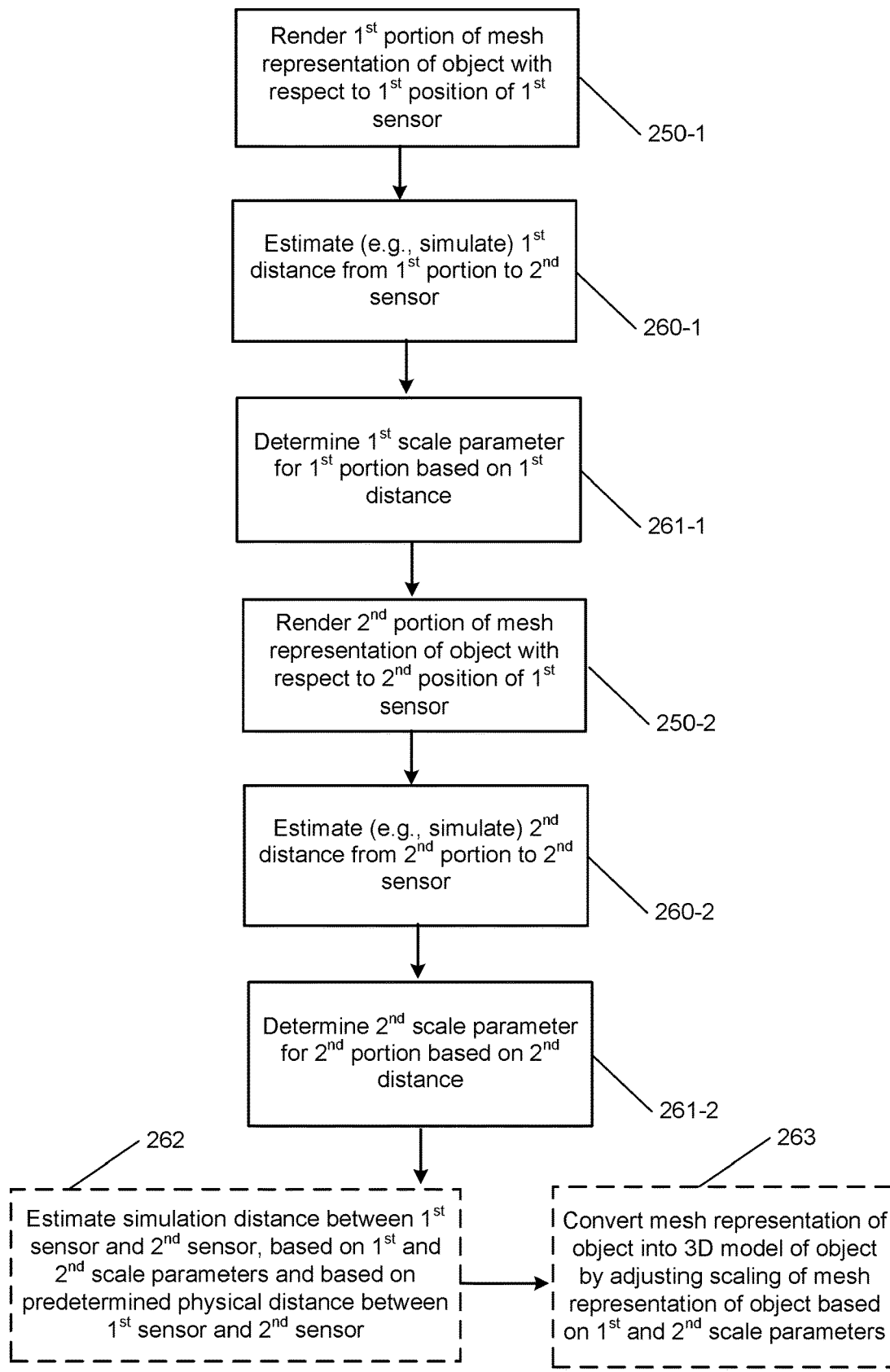

Referring now to FIG. 2D, operations of rendering (Block 250) and scaling (Block 260) the mesh representation may be performed alternately and repeatedly. For example, the operations of Blocks 250 and 260 may be performed iteratively for different portions of the mesh representation that correspond to respective different portions of the 3D object 135.

As an example, the operations of Blocks 250 and 260 may include rendering (Block 250-1) a first portion of the mesh representation of the 3D object 135 with respect to a first position (e.g., a first point of perspective) of a first sensor 101 (e.g., an image sensor) of a wireless electronic device 100. The operations may include estimating/simulating (Block 260-1) a first distance from the first portion of the mesh representation to a second sensor 102 (e.g., a time-of-flight sensor) of the wireless electronic device 100. The operations may include determining (Block 261-1) a first scale parameter for the first portion of the mesh representation based on the first distance. Moreover, the operations may include rendering (Block 250-2) a second portion of the mesh representation of the 3D object 135 with respect to a second position (e.g., a second point of perspective) of the first sensor 101. For example, the first portion may be/include the selected portion 150-S that is illustrated in FIG. 1D, and the second portion may be offset from the selected portion 150-S such that it does not overlap the selected portion 150-S or only partially overlaps the selected portion 150-S. The operations may include estimating/simulating (Block 260-2) a second distance from the second portion of the mesh representation to the second sensor 102. The operations may also include determining (Block 261-2) a second scale parameter for the second portion of the mesh representation based on the second distance. Moreover, although FIG. 2D provides an example with respect to first and second positions of the first sensor 101, the operations of FIG. 2D may be repeated for three, four, or more positions of the first sensor 101.

The first and second scale parameters can then be used to convert (Block 263) the mesh representation of the 3D object 135 into the scaled 3D model 150'. For example, a scale of the mesh representation may be adjusted based on the first and second scale parameters. Accordingly, operation(s) of Block 263 may include applying the first and second scale parameters (e.g., applying an average scale parameter value that is based on the first and second scale parameters) to the mesh representation. Additionally or alternatively, the first and second scale parameters may be stored (Block 265 of FIG. 2A) in a storage medium 370 for subsequent application to the mesh representation. Moreover, in further addition or alternative to the operation(s) of Block 263, the scaling (Block 260) operations may include estimating (Block 262) a simulation (e.g., simulated rather than physical) distance between the first sensor 101 and the second sensor 102, based on the first and second scale parameters and based on a predetermined physical distance $D_P$ (FIG. 1E) between the first sensor 101 and the second sensor 102. As such, the scaling (Block 260) operations may compensate for the impact that the offset between the first sensor 101 and the second sensor 102 has on the mesh representation.

In some embodiments, the scaling (Block 260) operations may include reproducing measurements from the second sensor 102 to emulate/simulate an environment that facilitates calculating the scale of the mesh representation. Accordingly, estimated/simulated distances described herein may be determined based on reproduced measurements from the second sensor 102. For example, operations of estimating/simulating a distance may include generating an emulation of signals that are detected using the second sensor 102 by simulating how the signals, which are generated by the second sensor 102 and reflected off the 3D object 135 during capturing (Block 205' of FIG. 2C), would illuminate the 3D model 150 from a plurality of different points of perspective. In some embodiments, such generation of an emulation may include mapping the emulation to the signals detected using the second sensor 102.

In some embodiments, operation(s) of storing/displaying (Block 255 of FIG. 2A) a mesh representation may be performed in response to each instance of rendering (Blocks 250-1, 250-2) a portion of the mesh representation. Accordingly, the first portion of the mesh representation that is rendered in Block 250-1 may be stored before estimating/simulating (Block 260-1) the first distance, and the second portion of the mesh representation that is rendered in Block 250-2 may be stored before estimating/simulating (Block 260-2) the second distance.

Figure 2E:
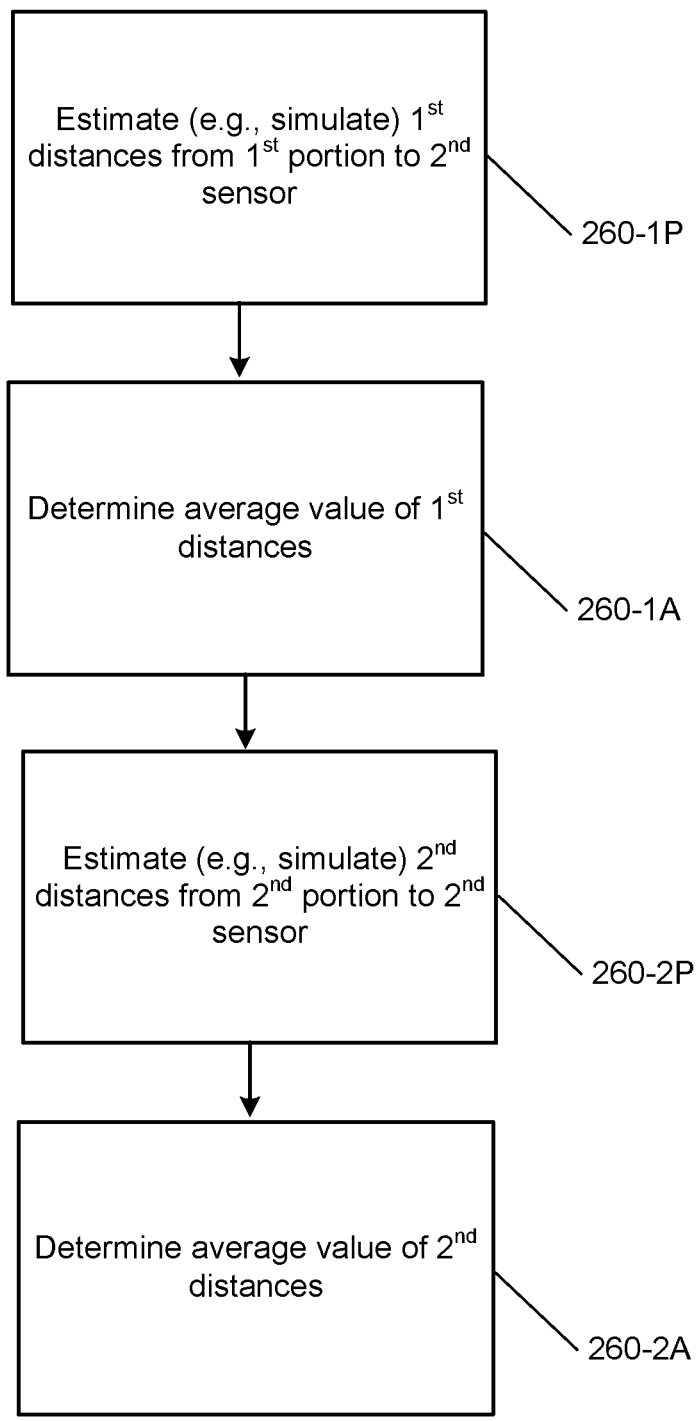

Referring now to FIG. 2E, operations of estimating/simulating (Block 260-1 of FIG. 2D) the first distance may include estimating/simulating (Block 260-1P) a first plurality of distances from a first plurality of points, respectively, of the first portion of the mesh representation to the second sensor 102. An average value of the first plurality of distances can then be determined (Block 260-1A). Referring again to FIG. 1D, the average value may be an average distance between the second sensor 102 and points that are in a selected portion 150-S (e.g., a circle or other measurement window) of the mesh representation, or of a depth map that is derived from the mesh representation. Similarly, operations of estimating/simulating (Block 260-2 of FIG. 2D) the second distance may include estimating/simulating (Block 260-2P) a second plurality of distances from a second plurality of points, respectively, of the second portion of the mesh representation to the second sensor 102. An average value of the second plurality of distances may then be determined (Block 260-2A).

Figure 2F:
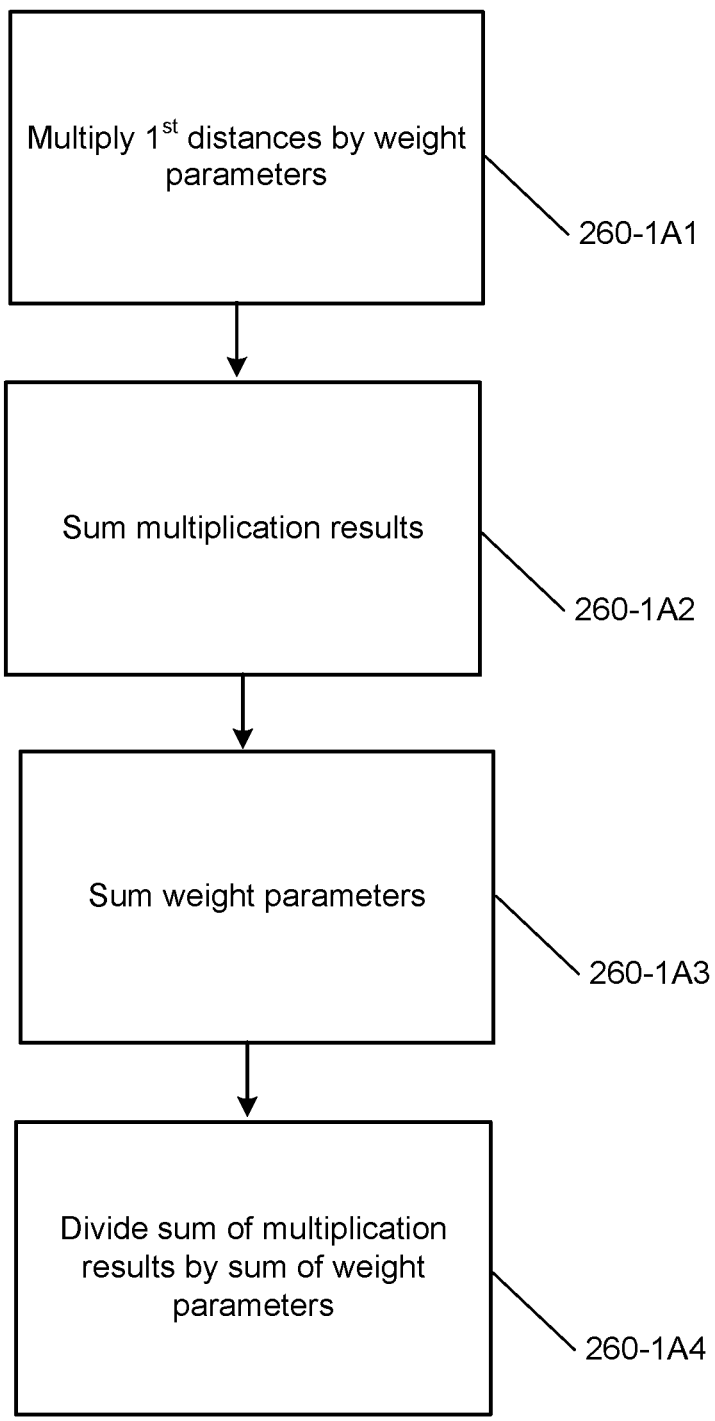

Referring now to FIG. 2F, operations of determining (Block 260-1A of FIG. 2E) the average value of the first plurality of distances may include determining a weighted average with respect to a first position of a first sensor 101. This weighted average may be determined by multiplying (Block 260-1A1) the first plurality of distances by a plurality of weight parameters, respectively, to provide a plurality of multiplication results. The plurality of weight parameters may be determined based on a plurality of color values, respectively, of the first portion of the mesh representation and based on the first plurality of distances. Determining the weighted average may also include summing (Block 260-1A2) the plurality of multiplication results, summing (Block 260-1A3) the plurality of weight parameters, and dividing (Block 260-1A4) the sum of the plurality of multiplication results by the sum of the plurality of weight parameters.

The operations of FIG. 2F are performed to simulate how averaging in a time-of-flight sensor 102 is weighted by the number of photons (i.e., light illumination) reflected by a 3D object 135. If one part of the 3D object 135 is less reflective, it will have less weight in the final measurement value. The number of photons reflected depends on the distance from the time-of-flight sensor 102 to the 3D object 135. For example, the farther away the 3D object 135 is, the fewer the photons that will be reflected back to the time-of-flight sensor 102. The number of photons reflected also depends on the color of the 3D object 135. For example, the color white reflects more photons than the color black. Moreover, in some embodiments, the time-of-flight sensor 102 may detect infrared light, whereas an image sensor 101 may determine color.

Accordingly, to simulate how averaging in a time-of-flight sensor 102 is weighted, the operations of FIG. 2F adjust the averaging of distance by introducing a weight component. In particular, the operations may use the following Equation 1 to adjust the averaging of distance:

$$\text{Weighted average distance } d = \Sigma(d\_i * w\_i) / \Sigma(w\_i) \quad \text{(Equation 1)}$$

The variable $d\_i$ may be the distance from a particular pixel 150-P within the selection window 150-S of FIG. 1D to the time-of-flight sensor 102, whereas the distance d is the weighted average (over a plurality of pixels 150-P) for one camera position.

The variable $w\_i$ is the weight, and depends on the distance and color, as indicated in the following Equation 2:

$$w\_i = f(c)/d\_i^2 \quad \text{(Equation 2)}$$

The weight is inversely proportional to the squared distance (due to light's properties). The effect of the color may be an approximation with respect to the time-of-flight sensor 102, as viewing the visible colors via the image sensor 101 may only approximate the reflectivity in the infrared light that is detected by the time-of-flight sensor 102.

The function f(c) represents this approximation. This function can have multiple approximations, one example of which is the gamma curve function indicated in the following Equation 3:

$$f(c) = c^{2.2} \quad \text{(Equation 3)}$$

The variable c is the color. The variable c is different for a brighter pixel 150-P than for a darker pixel 150-P. For example, the darker pixel 150-P may have a lower value of c. Accordingly, Equations 1-3 may be used to account for both distance and color, thus increasing precision when modeling the 3D object 135.

Figure 2G:
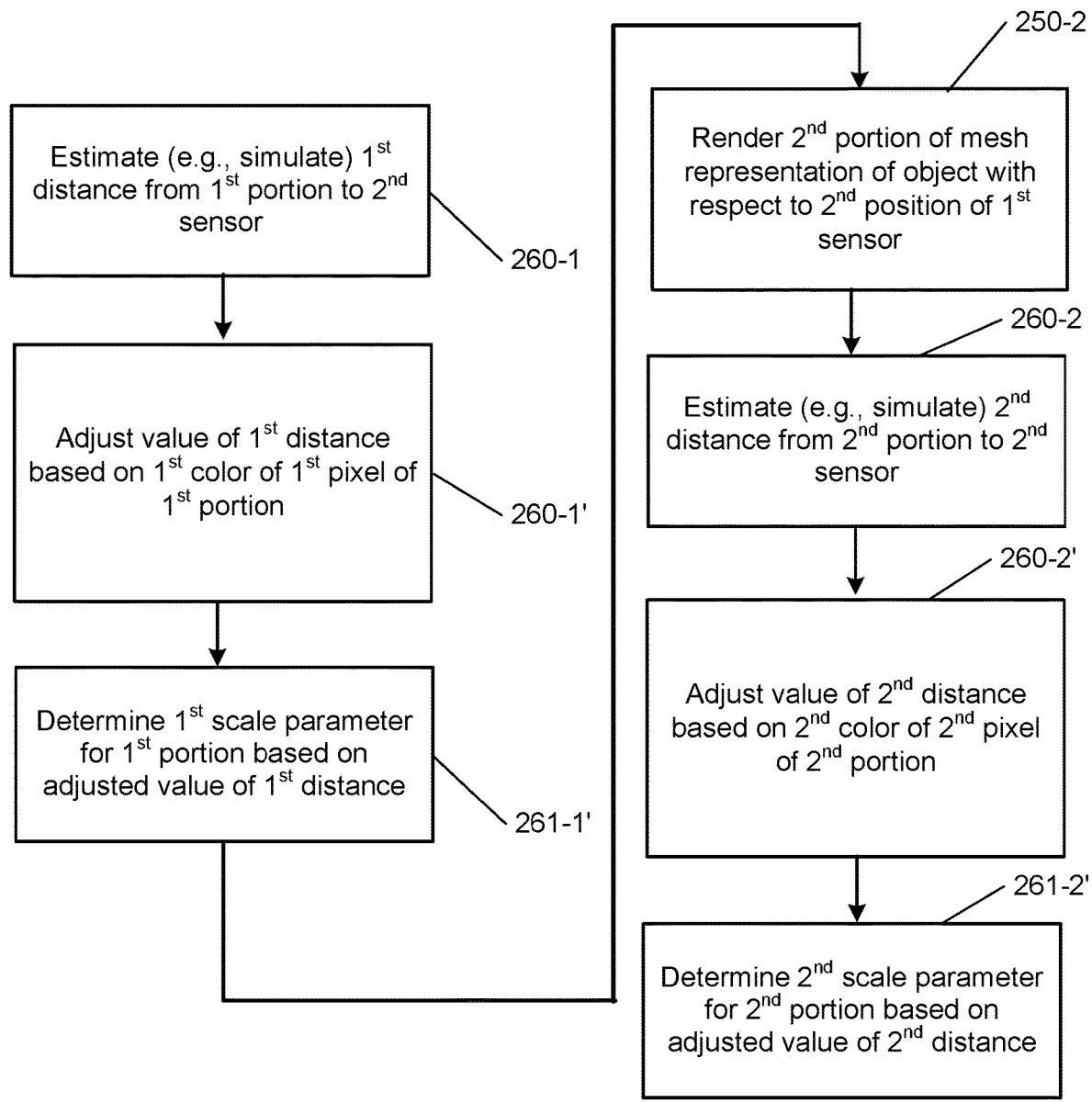

Referring now to FIG. 2G, the scaling (Block 260) operations may compensate for the effect that one or more colors of the 3D object 135 may have on signals that are generated by the image capture device 340 (FIG. 3A) and reflected by the 3D object 135 back to the image capture device 340. As different colors reflect light differently, it may be beneficial to compensate for color(s) of the 3D object 135. This compensation may be performed in addition to, or as an alternative to, the compensating for the offset between the first sensor 101 and the second sensor 102 that is described herein with respect to Block 262 (FIG. 2D/2H).

For example, the scaling (Block 260) operations may include adjusting (Block 260-1') a value of the first distance based on a first color of a first pixel 150-$P_1$ (FIG. 1D) of the first portion of the mesh representation. Operation(s) of determining (Block 261-1 of FIG. 2D) the first scale parameter may include determining (Block 261-1') the first scale parameter based on the adjusted value of the first distance. Moreover, the scaling (Block 260) operations may further include adjusting (Block 260-2') a value of the second distance based on a second color of a second pixel 150-$P_2$ (FIG. 1D) of the second portion of the mesh representation. Operation(s) of determining (Block 261-2 of FIG. 2D) the second scale parameter may include determining (Block 261-2') the second scale parameter based on the adjusted value of the second distance.

Figure 2H:
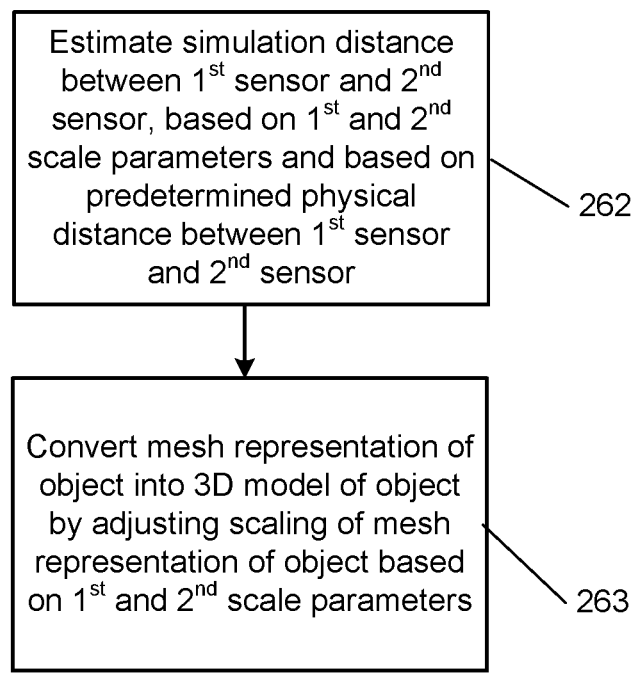

Referring now to FIG. 2H, operation(s) of converting (Block 263 of FIG. 2D) the mesh representation into the scaled 3D model 150' may in some embodiments, be performed after estimating (Block 262) the simulation distance between the first sensor 101 and the second sensor 102. In particular, the converting operation(s) of Block 263 may use the simulation distance that is provided by the estimating operation(s) of Block 262. Accordingly, the scaled 3D model 150' may benefit from the compensation for the offset between the first sensor 101 and the second sensor 102 that is provided by the operation(s) of Block 262.

Figure 2I:
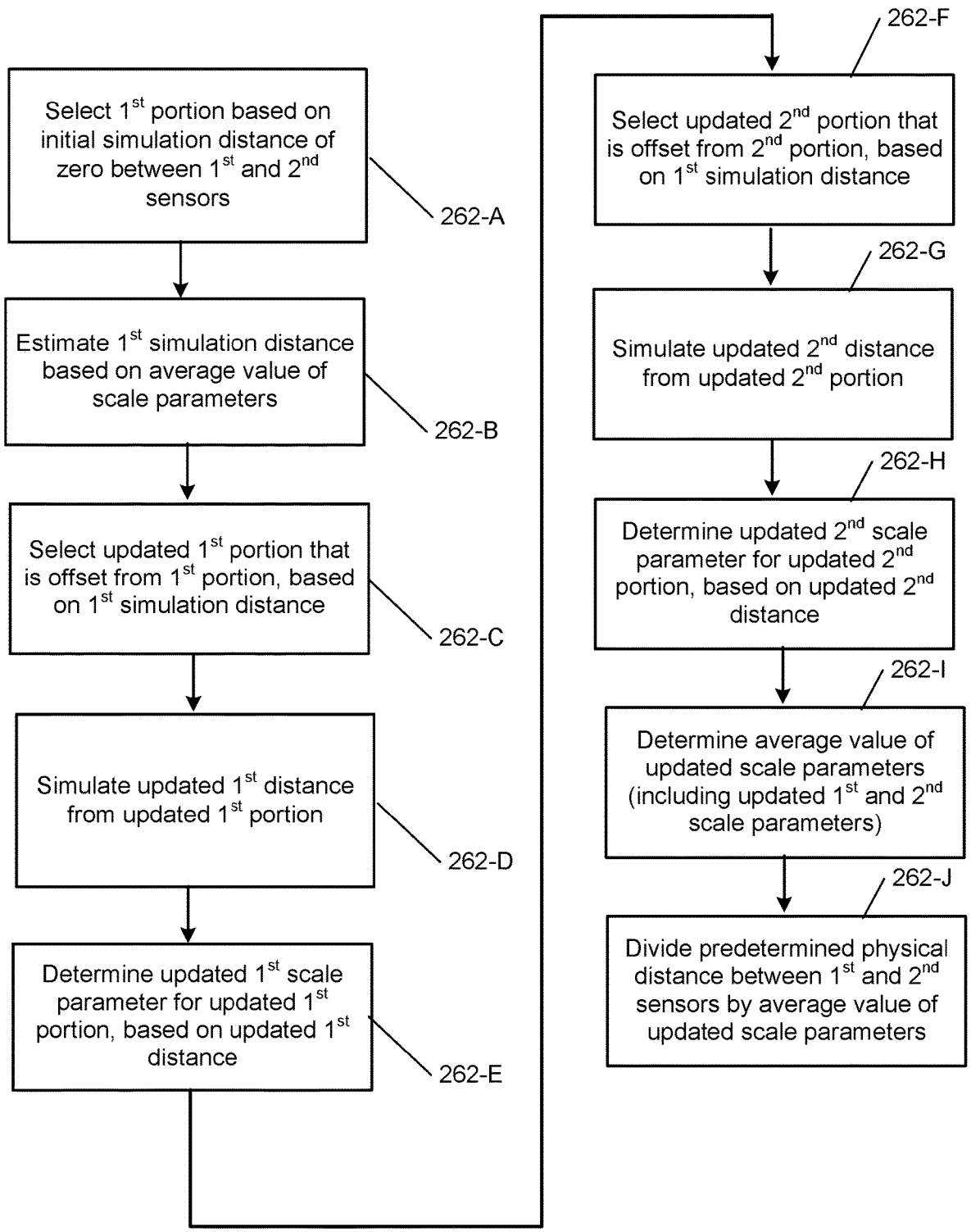

Referring now to FIG. 2I, the estimating operation(s) of Block 262 may include an iterative process. For example, an average value of a plurality of scale parameters, including the first and second scale parameters, may be determined, and estimating (Block 262) the simulation distance between the first sensor 101 and the second sensor 102 may be performed based on the average value of the plurality of scale parameters. The iterative process may estimate two, three, four, or more simulation distances. As an example, in some embodiments, estimating the simulation distance based on the average value of the plurality of scale parameters may include estimating (Block 262-B) a first simulation distance. Moreover, a second simulation distance may be estimated.

Estimating the second simulation distance may include various operations. For example, estimating the second simulation distance may include selecting (Block 262-C) an updated first portion of the mesh representation that is offset from the first portion of the mesh representation based on the first simulation distance. Estimating the second simulation distance may include simulating (Block 262-D) an updated first distance from the updated first portion of the mesh representation to the second sensor 102. Estimating the second simulation distance may include determining (Block 262-E) an updated first scale parameter for the updated first portion of the mesh representation based on the updated first distance. Estimating the second simulation distance may include selecting (Block 262-F) an updated second portion of the mesh representation that is offset from the second portion of the mesh representation based on the first simulation distance. Estimating the second simulation distance may include simulating (Block 262-G) an updated second distance from the updated second portion of the mesh representation to the second sensor 102. Estimating the second simulation distance may include determining (Block 262-H) an updated second scale parameter for the updated second portion of the mesh representation based on the updated second distance. Estimating the second simulation distance may include determining (Block 262-I) an average value of an updated plurality of scale parameters that includes the updated first and second scale parameters. Moreover, estimating the second simulation distance may include dividing (Block 262-J) the predetermined physical distance $D_P$ between the first sensor 101 and the second sensor 102 by the average value of the updated plurality of scale parameters.

Referring still to FIG. 2I, operation(s) of estimating (Block 262-B) the first simulation distance may preceded by selecting (Block 262-A) the first portion of the mesh representation based on an initial simulation distance having a value of zero. Accordingly, starting with the initial simulation distance set to zero, the simulation distance may be iteratively updated/estimated to provide a scaled/simulated distance, for the mesh representation, that corresponds to the physical distance D. At a distance of zero, the first sensor 101 and the second sensor 102 would be at the same location.

In some embodiments, operation(s) in FIG. 2I of determining (Block 262-I) an average value of scale factors may be performed using the following Equation 4:

Average scale factor $k=\Sigma(k_i*w_i)/\Sigma w_i$ (Equation 4)

The variables ki and wi are the scale ratio for a particular camera position and a weight for the particular camera position, respectively. Also, operations in FIG. 2I of simulating (Blocks 262-D and 262-G) an updated distance may be referred to herein as estimating a new baseline and may be performed using the following Equation 5:

$bl\_s = bl\_p/k$ (Equation 5)

The variables bl_s and bl_p are an estimated baseline and a physical baseline, respectively. The physical baseline is the predetermined physical distance D. Moreover, operations in FIG. 2I of determining (Blocks 262-E and 262-H) an updated scale parameter may be referred to herein as calculating a scale ratio and may be performed using the following Equation 6:

$ki = d\_t/d\_s$ (Equation 6)

The variables d_t and d_s are the distance measured by the second sensor 102 at a particular camera position and an estimated/simulated distance from the mesh representation to the second sensor 102, respectively.

Figure 2J:
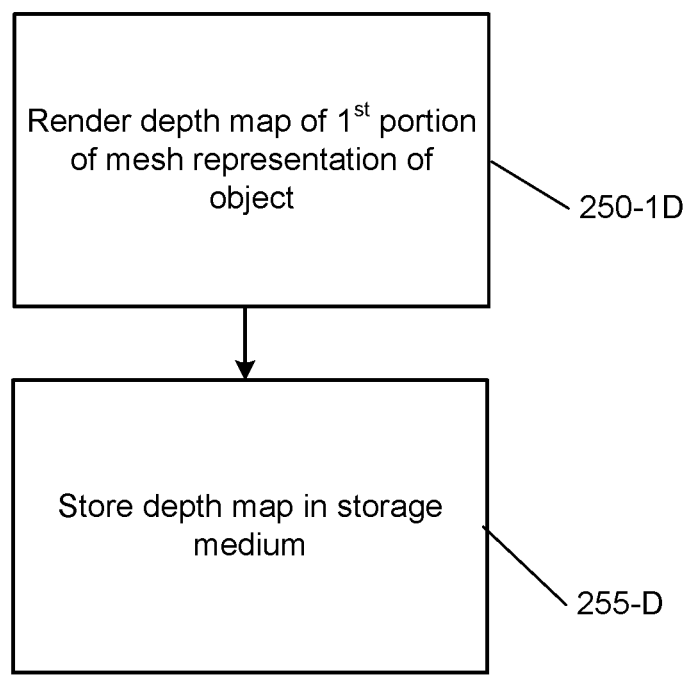

Referring now to FIG. 2J, operation(s) of rendering (Block 250-1 of FIG. 2D) the first portion of the mesh representation of the 3D object 135 may include rendering (Block 250-1D) a depth map of the first portion of the mesh representation. For example, operation(s) of rendering (Block 250-1D) the depth map may be performed using data from the first sensor(s) 101 and/or the second sensor(s) 102. Moreover, operation(s) of storing/displaying (Block 255 of FIG. 2A) the mesh representation may, in some embodiments, include storing (Block 255-D) the depth map in a storage medium 370 (FIG. 3A).

Although FIGS. 2C-2J individually illustrate various details that may be added to operations of Block 250 or Block 260 in FIGS. 2A and 2B, any detail added with respect to Block 250 may be combined with any detail added with respect to Block 260, and vice versa. For example, the added detail of estimating (Block 262 of FIG. 2D/2H) the simulation distance between the first sensor 101 and the second sensor 102 may be performed in combination with operations of any of the FIGS. 2A-2J. Also, different ones of the details with respect to Block 260 are not intended to be mutually exclusive. Rather, they may be combined. For example, the added details of FIGS. 2C-2I with respect to Block 260 may be combined with each other. Similarly, the added details in FIGS. 2C, 2D, and 2J with respect to Block 250 may be combined with each other.

Referring now to FIG. 3A, a block diagram is provided of an electronic device 100, according to various embodiments. The electronic device 100 may include a processor 350 and a storage medium 370. Moreover, the electronic device 100 may, in some embodiments, include an image capture device 340, a network interface 360, and/or a Graphical User Interface (GUI) 390. The GUI 390 may include a display and/or a keypad or other interface that receives inputs from a user 110. In some embodiments, the GUI 390 may include a touchscreen.

The image capture device 340 may be any camera or other device that captures image data of the 3D object 135 that can be used to construct a preliminary digital 3D model 150 of the 3D object 135. In some embodiments, the image capture device 340 may be a monocular camera, which may be the only camera of the electronic device 100, or may be the only rear-facing camera or the only forward-facing camera of the electronic device 100. The image capture device 340 may include one or more sensors 101, and one or more lenses L-101 on the sensor(s) 101. Moreover, the image capture device 340 may, in some embodiments, include one or more sensors 102. The sensor(s) 101 may be a different type of sensor from the sensor(s) 102. For example, the sensor(s) 101 may include one or more image sensors, whereas the sensor(s) 102 may include one or more time-of-flight sensors, such as single-beam time-of-flight sensors. The image sensor(s) 101 may be configured to capture 2D images, such as photographs, of the 3D object 135. The time-of-flight sensor(s) 102, on the other hand, may be configured to perform distance measurements based on light that is generated by the time-of-flight sensor(s) 102 and reflected back to the time-of-flight sensor(s) 102 by the 3D object 135. Accordingly, the time-of-flight sensor(s) 102 may also be used for auto-focusing operations.

The processor 350 may be coupled to the network interface 360. The processor 350 may be configured to communicate with a device that provides image data (such as another electronic device 100) and/or with a 3D printer, via the network interface 360. For example, the network interface 360 may include one or more wireless interfaces (e.g., 3G/LTE/4G, other cellular, WiFi, other short-range, etc.) and/or one or more physical wired interfaces (e.g., Ethernet, serial, USB interfaces, etc.).

Referring still to FIG. 3A, the storage medium 370 may be coupled to the processor 350. The storage medium 370 may also store instructions/algorithms used by the processor 350. For example, the storage medium 370 of the electronic device 100 may include one or more algorithms that control scaling operations for a mesh representation (e.g., a preliminary digital 3D model 150) of a 3D object 135.

The electronic device 100 may, in some embodiments, include the GUI 390. For example, a user 110 may use the GUI 390 at the electronic device 100 to provide user input(s) (i) to capture, or otherwise obtain, image data with respect to the 3D object 135, (ii) to construct a preliminary digital 3D model 150 of the 3D object 135, and/or (iii) to perform scaling operations for the preliminary digital 3D model 150.

Figure 3B:
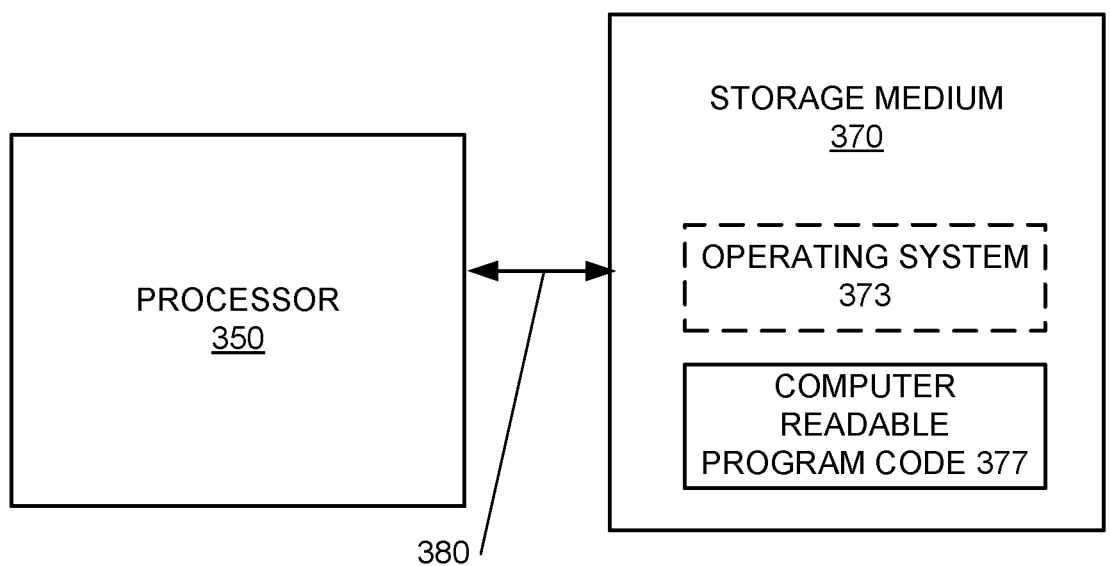
FIG. 3B is a block diagram that illustrates details of an example processor and memory that may be used in accordance with various embodiments.

Referring now to FIG. 3B, a block diagram is provided that illustrates details of an example processor 350 and storage medium 370 of an electronic device 100 that may be used in accordance with various embodiments. The processor 350 communicates with the storage medium 370 via an address/data bus 380. The processor 350 may be, for example, a commercially available or custom microprocessor. Moreover, the processor 350 may include multiple processors. The storage medium 370 may be referred to herein as a "memory" and may be representative of the overall hierarchy of memory devices containing the software and data used to implement various functions of an electronic device 100 as described herein. The storage medium 370 may include, but is not limited to, the following types of devices: cache, ROM, PROM, EPROM, EEPROM, flash, Static RAM (SRAM), and Dynamic RAM (DRAM).

As shown in FIG. 3B, the storage medium 370 may hold various categories of software and data, such as computer readable program code 377 and/or an operating system 373. The operating system 373 controls operations of an electronic device 100. In particular, the operating system 373 may manage the resources of the electronic device 100 and may coordinate execution of various programs by the processor 350. The computer readable program code 377, when executed by the processor 350, may cause the processor 350 to perform any of the operations illustrated in the flowcharts of FIGS. 2A-2J.

Various embodiments herein provide improved methods for modeling a 3D object 135. For example, various embodiments herein may increase the precision of modeling a 3D object 135 by accounting for the scale of the 3D object 135. Although operations herein have been described in the context of modeling a human head, these operations may be applied to modeling other objects, including models of animals, automobiles, and various other objects.

The following is a non-limiting example of modeling a 3D object 135, according to various embodiments herein. A 3D model/mesh 150 of the 3D object 135 may be created by capturing a plurality of 2D images 130 while walking around the 3D object 135. Each time a 2D image 130, which is a view of the 3D object 135 from a particular perspective, is captured, actual (rather than simulated) time-of-flight measurement data may be captured as well. This actual measurement data is generated using light reflected from a physical surface of the 3D object 135. Each captured 2D image 130 (e.g., photograph) has a respective light waveform associated with it. Accordingly, repeatedly scaling the 3D model/mesh 150 from different points of perspective (e.g., using post processing) corresponding to different 2D images 130 and light waveforms may provide increased precision for modeling the 3D object 135.

In some embodiments, a time-of-flight measurement window 150-S (e.g., a circle) may be selected on the 3D model/mesh 150 and may correspond to the field of view FOV-102 (FIG. 1E) that is exposed by the time-of-flight light emitter/sensor 102. Within the window 150-S of mesh data, a weighted average of distance may be computed from a previously-calculated depth map, which may be derived from the 3D model/mesh 150. Moreover, as the time-of-flight emitter/sensor 102 may be offset from the image sensor 101 by a non-zero baseline distance $D_P$, correcting for this non-zero baseline distance $D_P$ may further enhance precision for modeling the 3D object 135.

Specific example embodiments of present inventive concepts are described with reference to the accompanying drawings. Present inventive concepts may, however, be embodied in a variety of different forms and should not be construed as limited to the embodiments set forth herein. Rather, these embodiments are provided so that this disclosure will be thorough and complete and will fully convey the scope of present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of present inventive concepts.

Example embodiments of present inventive concepts may be embodied as nodes, devices, apparatuses, and methods. Accordingly, example embodiments of present inventive concepts may be embodied in hardware and/or in software (including firmware, resident software, micro-code, etc.). Furthermore, example embodiments of present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create/use circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of present inventive concepts. The present inventive concepts are defined by the following claims, with equivalents of the claims to be included therein.

What is claimed is:

1. A method of modeling a three-dimensional, 3D, object, the method comprising:
   rendering a first portion of a mesh representation of the 3D object with respect to a first position of a first sensor of a wireless electronic device;
   simulating a first distance from the first portion of the mesh representation to a second sensor of the wireless electronic device;
   determining a first scale parameter for the first portion of the mesh representation based on the first distance;
   rendering a second portion of the mesh representation of the 3D object with respect to a second position of the first sensor;
   simulating a second distance from the second portion of the mesh representation to the second sensor;
   determining a second scale parameter for the second portion of the mesh representation based on the second distance; and
   estimating a simulation distance between the first sensor and the second sensor, based on the first and second scale parameters and based on a predetermined physical distance between the first sensor and the second sensor.

2. The method of claim 1, further comprising converting the mesh representation of the 3D object into a 3D model of the 3D object by adjusting scaling of the mesh representation of the 3D object based on the first and second scale parameters.

3. The method of claim 1,
   wherein simulating the first distance comprises simulating a first plurality of distances from a first plurality of points, respectively, of the first portion of the mesh representation to the second sensor,
   wherein the method further comprises determining an average value of the first plurality of distances,
   wherein simulating the second distance comprises simulating a second plurality of distances from a second plurality of points, respectively, of the second portion of the mesh representation to the second sensor, and
   wherein the method further comprises determining an average value of the second plurality of distances.

4. The method of claim 3, wherein determining the average value of the first plurality of distances comprises determining a weighted average with respect to a first position of a first sensor by:
   multiplying the first plurality of distances by a plurality of weight parameters, respectively, to provide a plurality of multiplication results, wherein the plurality of weight parameters is determined based on a plurality of color values, respectively, of the first portion of the mesh representation and based on the first plurality of distances;
   summing the plurality of multiplication results;
   summing the plurality of weight parameters; and
   dividing the sum of the plurality of multiplication results by the sum of the plurality of weight parameters.

5. The method of claim 1, further comprising determining an average value of a plurality of scale parameters comprising the first and second scale parameters, wherein estimating the simulation distance between the first sensor and the second sensor is performed based on the average value of the plurality of scale parameters.

6. The method of claim 5, wherein estimating the simulation distance based on the average value of the plurality of scale parameters comprises estimating a first simulation distance, the method further comprising:
   estimating a second simulation distance by:
      selecting an updated first portion of the mesh representation that is offset from the first portion of the mesh representation based on the first simulation distance;

simulating an updated first distance from the updated first portion of the mesh representation to the second sensor;

determining an updated first scale parameter for the updated first portion of the mesh representation based on the updated first distance;

selecting an updated second portion of the mesh representation that is offset from the second portion of the mesh representation based on the first simulation distance;

simulating an updated second distance from the updated second portion of the mesh representation to the second sensor;

determining an updated second scale parameter for the updated second portion of the mesh representation based on the updated second distance;

determining an average value of an updated plurality of scale parameters comprising the updated first and second scale parameters; and dividing the predetermined physical distance between the first sensor and the second sensor by the average value of the updated plurality of scale parameters.

7. The method of claim 6, wherein estimating the first simulation distance is preceded by:

selecting the first portion of the mesh representation based on an initial simulation distance of zero.

8. The method of claim 1, wherein rendering the first portion of the mesh representation comprises rendering a depth map of the first portion of the mesh representation.

9. The method of claim 8, further comprising storing the depth map in a storage medium.

10. The method of claim 8, wherein rendering the depth map is performed using data from the first sensor and the second sensor.

11. The method of claim 1, wherein the first sensor and the second sensor comprise different types of sensors, respectively.

12. The method of claim 11, wherein the first sensor and the second sensor comprise an image sensor and a single-beam time-of-flight sensor, respectively.

13. The method of claim 1, further comprising:

adjusting a value of the first distance based on a first color of a first pixel of the first portion of the mesh representation, wherein determining the first scale parameter is performed based on the adjusted value of the first distance; and adjusting a value of the second distance based on a second color of a second pixel of the second portion of the mesh representation, wherein determining the second scale parameter is performed based on the adjusted value of the second distance.

14. The method of claim 1, further comprising receiving, in a storage medium, image data for the 3D object from an image capture device, wherein rendering the first portion of the mesh representation and rendering the second portion of the mesh representation are performed using the image data.

15. An electronic device comprising:

a processor; and a storage medium coupled to the processor and comprising computer readable program code that when executed by the processor causes the processor to perform operations comprising:

rendering a first portion of a mesh representation of a three-dimensional, 3D, object with respect to a first position of a first sensor of a wireless electronic device;

simulating a first distance from the first portion of the mesh representation to a second sensor of the wireless electronic device;

determining a first scale parameter for the first portion of the mesh representation based on the first distance;

rendering a second portion of the mesh representation of the 3D object with respect to a second position of the first sensor;

simulating a second distance from the second portion of the mesh representation to the second sensor;

determining a second scale parameter for the second portion of the mesh representation based on the second distance; and estimating a simulation distance between the first sensor and the second sensor, based on the first and second scale parameters and based on a predetermined physical distance between the first sensor and the second sensor.

* * * * *